(12) United States Patent
Richiuso et al.

(10) Patent No.: US 6,561,704 B2
(45) Date of Patent: May 13, 2003

(54) CAMERA WITH SELF-TIMER AND TIMER FOR USE IN CAMERA

(75) Inventors: Leonard Richiuso, Rochester, NY (US); Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 14 days.

(21) Appl. No.: 09/881,259

(22) Filed: Jun. 14, 2001

(65) Prior Publication Data

US 2003/0002873 A1 Jan. 2, 2003

(51) Int. Cl.$^7$ ................................................ G03B 9/64
(52) U.S. Cl. ...................................... 396/472; 396/473
(58) Field of Search ................................ 396/264, 443, 396/444, 472, 473

(56) References Cited

U.S. PATENT DOCUMENTS

| | | |
|---|---|---|
| 4,038,675 A | 7/1977 | Katai et al. |
| 4,268,154 A | 5/1981 | Daitoku |
| 4,755,841 A | 7/1988 | Barclay |
| 4,755,842 A | 7/1988 | Barclay et al. |
| 5,105,213 A | * 4/1992 | Takahashi .................. 396/452 |

* cited by examiner

Primary Examiner—David M. Gray
(74) Attorney, Agent, or Firm—Roland R. Schindler, II (57) ABSTRACT

According to the invention there is provided a camera having at least one image capture system. A timer latch is biased for movement between a lock position preventing image capture system from capturing an image and a release position that allows the image capture system to capture an image. An actuator is biased for movement between a first position separated from the timer latch and a second position moving the timer latch into the release position. A damper slows the movement of the actuator. According to another aspect of the present invention there is provided a camera having at least one image capture system having a movement actuated shutter and a lever biased to move the shutter. A timer latch is biased for movement between a lock position preventing the lever from moving the shutter and a release position permitting the lever to move the shutter. An actuator is biased for movement between a first position separated from the timer latch and a second position moving the timer latch into the release position. A damper slows movement of the actuator. Movement of the actuator is damped during a first range of actuator movement and is undamped during a second range of actuator movement proximate to the second position.

35 Claims, 13 Drawing Sheets

CAMERA WITH SELF-TIMER AND TIMER FOR USE IN CAMERA

FIELD OF THE INVENTION

The present invention relates to the field of photography. More particularly, the present invention relates to a photographic camera having a self-timer and a self-timer for use in a photographic camera.

BACKGROUND OF THE INVENTION

One of the most popular camera features is the self-timer. The self-timer is a user activated feature that causes the camera to capture an image at a set period of time after the timer has been activated. The primary benefit of this feature is that it permits the user of the camera to position the camera to capture a scene, to engage the self-timer and then to position themselves in the scene prior to exposure.

Cameras having self-timers have been known for many years. Some self-timing cameras have a mechanical self-timer with clockwork type arrangements inside the camera to capture an image at the end of a delay period. An example of such a mechanical system is shown in U.S. Pat. No. 4,268,154. Other cameras use electronic systems such as timing circuits and microprocessors to cause a camera to capture an image at the end of a delay period. An example of such an electrical system is shown in U.S. Pat. No. 4,038,675. The mechanical and electrical systems of the prior art can be complex and costly. Thus, what is needed is a low-cost camera having a self-timer and a low-cost timer for use in a photographic film camera.

SUMMARY OF THE INVENTION

According to the present invention there is provided a camera having at least one image capture system. A timer latch is biased for movement between a lock position preventing an image capture system from capturing an image and a release position that allows the image capture system to capture an image. An actuator is biased for movement between a first position separated from the timer latch and a second position moving the timer latch into the release position. A damper is positioned to engage the outer surface to slow the movement of the actuator.

According to another aspect of the present invention there is provided a camera having at least one image capture system having a movement actuated shutter and a lever biased to move the shutter. A timer latch is biased for movement between a lock position preventing the lever from moving the shutter and a release position permitting the lever to move the shutter. An actuator is biased for movement between a first position separated from the timer latch and a second position driving the timer latch into the release position. A damper slows movement of the actuator. Movement of the actuator is damped during a first range of actuator movement and is undamped during a second range of actuator movement proximate to the second position.

BRIEF DESCRIPTION OF THE DRAWINGS

While the specification concludes with claims particularly pointing out and distinctly claiming the subject matter of the present invention, it is believed that the invention will be better understood from the following detailed description when taken in conjunction with the accompanying drawings wherein:

DETAILED DESCRIPTION OF THE INVENTION

The present invention will be directed, in particular, to elements forming part of, or cooperating more directly with, an apparatus in accordance with the present invention. It is to be understood that elements not specifically shown or described may take various forms that are well known to those skilled in the art.

Figure 1:
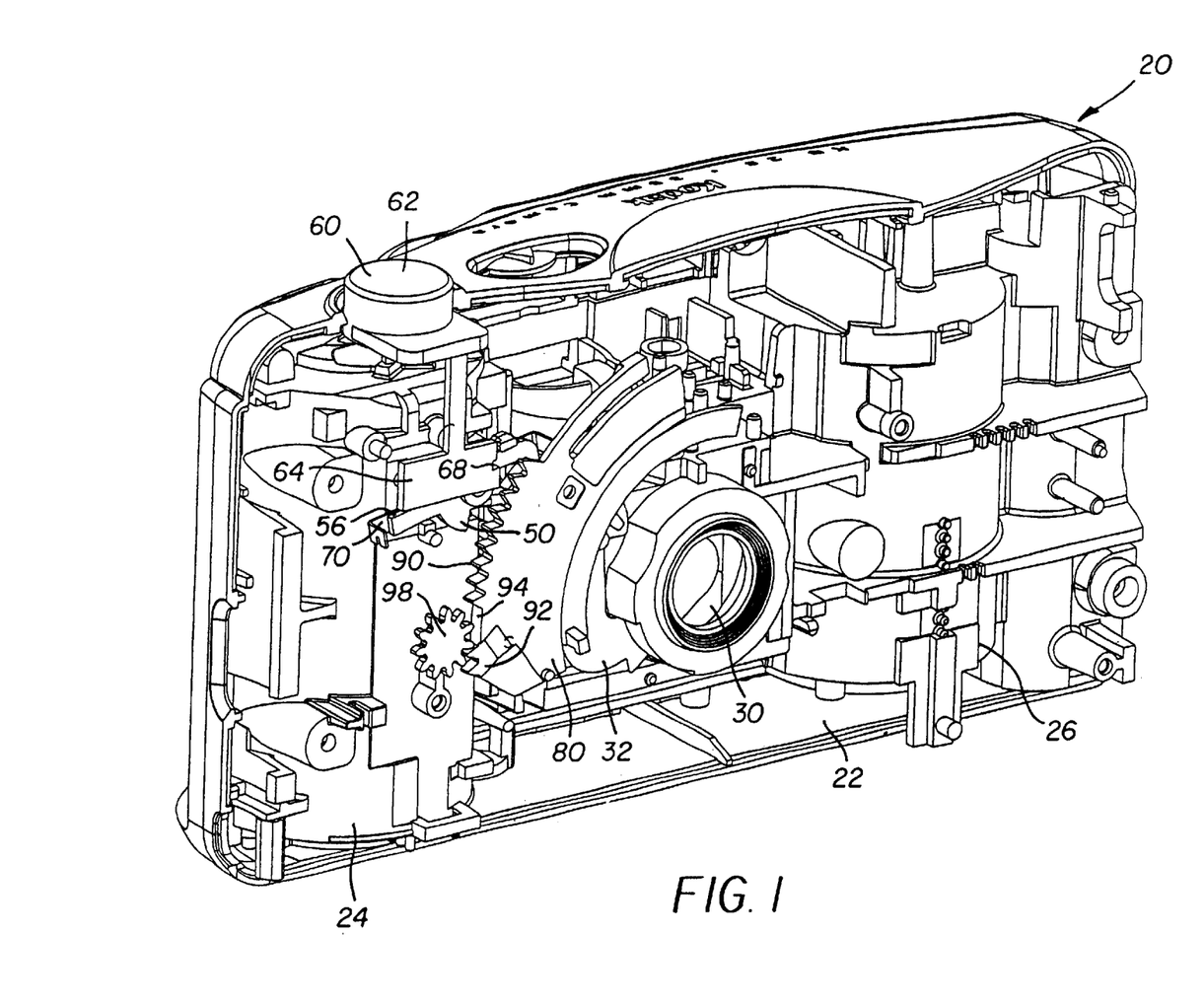
FIG. 1 illustrates a front perspective view of the camera of the present invention with a front cover removed.
Figure 2:
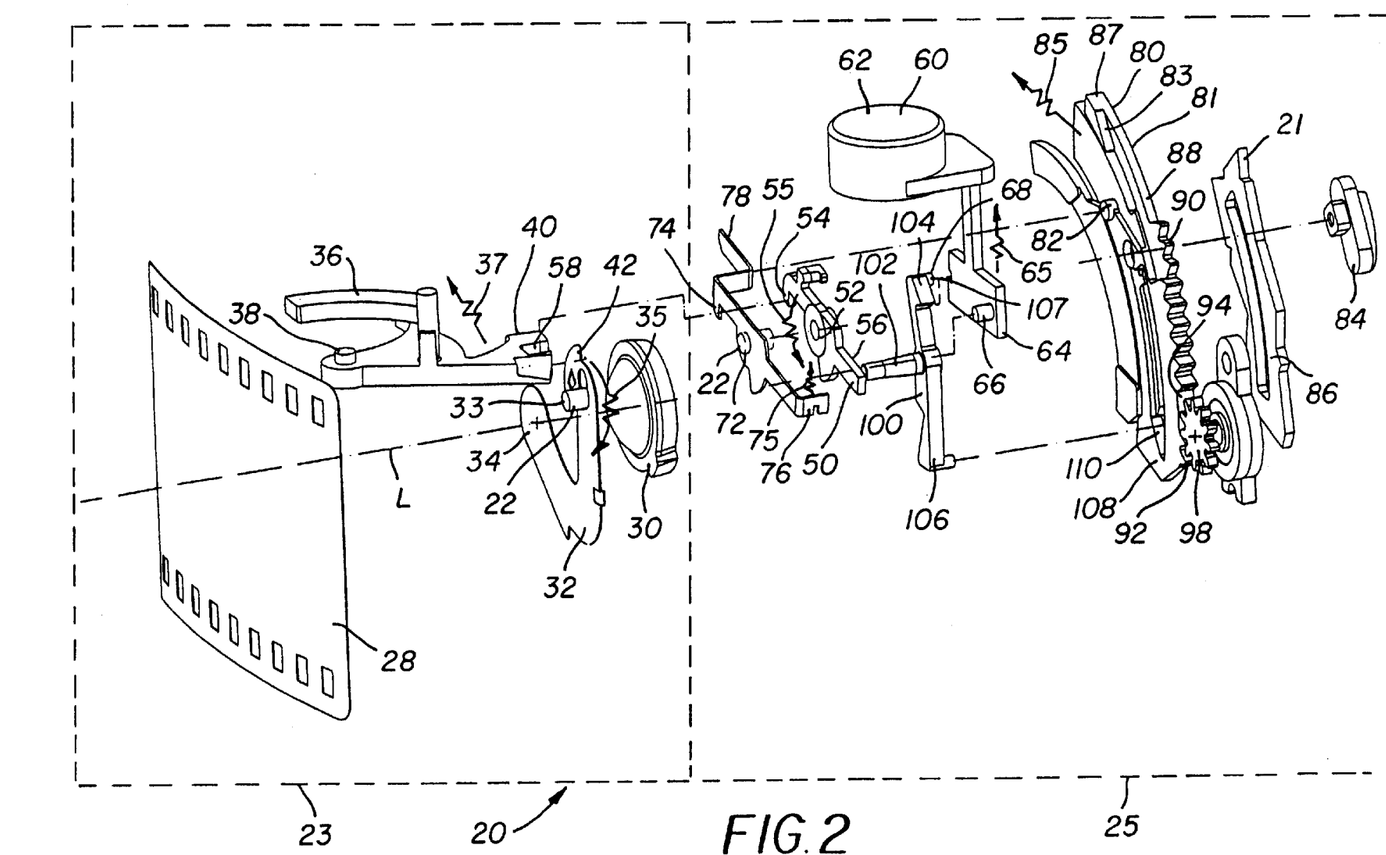
FIG. 2 illustrates an exploded view of the film exposure system and self-timer system of the camera of the present invention.

FIG. 1 illustrates a front perspective view of camera 20 in accordance with one embodiment of the present invention with a front plate 21 removed. FIG. 2 illustrates an exploded view of the film exposure system 23 and self-timer 25 of camera 20 with front plate 21 shown partially cut-away.

As is shown in FIGS. 1 and 2, camera 20 comprises a camera body 22 having a film take-up reel area 24 and a film cartridge holder 26. In the present application, a film cartridge (not shown) is inserted into film cartridge holder 26. Film 28 is then partially wound out of the film cartridge and into film take up reel area 24. A conventional film winding apparatus (not shown) is used for this purpose.

Lens 30 is disposed between film cartridge holder 26 and film take up reel area 24. Light from a photographic scene passes through lens 30 and travels generally along light path L to film 28. A shutter 32 is interposed between lens 30 and film 28. In the embodiment that is shown, shutter 32 is pivotally mounted about shaft 33 which is a feature of camera body 22. Shutter 32 has a light blocking surface 34 and is pivotally movable between a first position wherein light blocking surface 34 is positioned to block light path L and a second position wherein light blocking surface 34 is removed from light path L. To prevent unintended exposure, shutter 32 is biased into the first position by a first resilient member 35.

To capture an image on film 28, shutter 32 is rapidly moved through an exposure cycle beginning in the first position, travelling to the second position and ending in the first position. In certain circumstances, this exposure cycle must occur in less than $\frac{1}{250}^{th}$ of a second. To accomplish this, a high-energy lever 36 is used to accelerate shutter 32 through the exposure cycle. The high-energy lever 36, in turn, is accelerated through the exposure cycle by a second resilient member 37. In the embodiment shown, high-energy lever 36 has a shaft 38 which is pivotally mounted to camera body 22.

Prior to exposure, shutter 32 is maintained in the first position by action of first resilient member 35. During the exposure cycle, second resilient member 37 accelerates high-energy lever 36 in a counterclockwise fashion. This motion causes contact surface 40 of high-energy lever 36 to impact shutter contact 42. This impact causes shutter 32 to pivot in a counterclockwise fashion about shaft 33, thereby removing light blocking surface 34 from light path L to expose film 28 to light from the scene. The exposure cycle is completed as the shutter 32 is returned to the first position by first resilient member 35.

Following the exposure cycle, it is necessary to store sufficient potential energy in second resilient member 37 to permit proper acceleration of the high-energy lever 36 during the next exposure cycle. To store such energy in second resilient member 37, it is necessary to lock high-energy lever 36 into a fixed position. This is done using trigger latch 50. Trigger latch 50 locks high-energy lever 36 in place. This allows potential energy to be stored in second resilient member 37 to properly accelerate high-energy lever 34 during the next exposure cycle. In the present illustrated embodiment of the invention, the mechanical action of winding the film 28 to the next frame is used to store potential energy in second resilient member 37 after trigger latch 50 has been locked. This potential energy is stored until the next exposure. The structure that is used to restore potential energy in second resilient member 37 during camera winding is conventional and is not central to the present invention. Any of a number of structures that are well known in the art can be used for this purpose In the embodiment shown in FIGS. 1 and 2, trigger latch 50 has a central pivot mounting 52 which is fixed to a pivot 27. Pivot 27 is a feature of camera body 22. On opposing sides of the central pivot mounting 52, are a capture surface 54 and a release surface 56. Capture surface 54 is shaped to engage a cavity 58 on high-energy latch 36. Trigger latch 50 is pivotally movable between a latch position wherein capture surface 54 engages cavity 58 of high-energy latch 36 and a release position wherein capture surface 54 is separated from cavity 58. When capture surface 54 is inserted into cavity 58, high-energy latch 36 cannot move about shaft 38. This allows potential energy to be stored in second resilient member 37 as described above.

Trigger latch 50 is biased toward the latch position by a third resilient member 55. Trigger latch 50 is moved against this bias by a user operable button 60. Button 60 has a control surface 62 positioned outside of camera body 22 and an extension 64. In the embodiment shown, button 60 is movable between an outward position and an inward position. A fourth resilient member 65 biases button 60 toward the outward position. Extension 64 has a contact surface 66. Contact surface 66 is positioned so that when button 60 is in the outward position, contact surface 66 is separated from release surface 56 of trigger latch 50. However, when button 60 is moved to the inward position, contact surface 66 engages release surface 56 of trigger latch 50. This pivots release latch 50 in a clockwise direction to separate capture surface 54 from cavity 58. When capture surface 54 separates from cavity 58, high-energy lever 36 is released and, unless high-energy lever 36 is otherwise latched, an exposure cycle is initiated. In this manner, the user of camera 20 can controllably initiate an exposure cycle by depressing button 60.

The operation of self-timer 25 of camera 20 will now be described. A first component of self-timer 68 is timer latch 70. Timer latch 70 has a central mounting 72 that is pivotally mounted on pivot 27. On opposing sides of central mounting 72 are a capture surface 74 and biasing lever 76. Timer latch 70 is pivotally moveable between a latch position wherein capture surface 74 engages cavity 58 of high-energy latch 36 to prevent pivotal motion of high-energy latch 36 and a release position wherein capture surface 74 is separated from cavity 58. A timer latch biasing member 75 is fixed to biasing lever 76 to bias timer latch 70 into the latch position. Thus, to release high-energy latch 36 at the start of an exposure cycle, it is necessary to position both trigger latch 50 and timer latch 70 in the release position.

In the embodiment of FIGS. 1 and 2, trigger latch 50 and timer latch 70 are pivotally mounted adjacent to each other on pivot 27. However, timer latch 70 and trigger latch 50 move independently of each other. As discussed above, trigger latch 50 is actuated by operation of contact surface 66 on button 60. However, contact surface 66 does not contact timer latch 70. Instead, timer latch 70 is moved into and out of the release position by an actuator 80.

Figure 3:
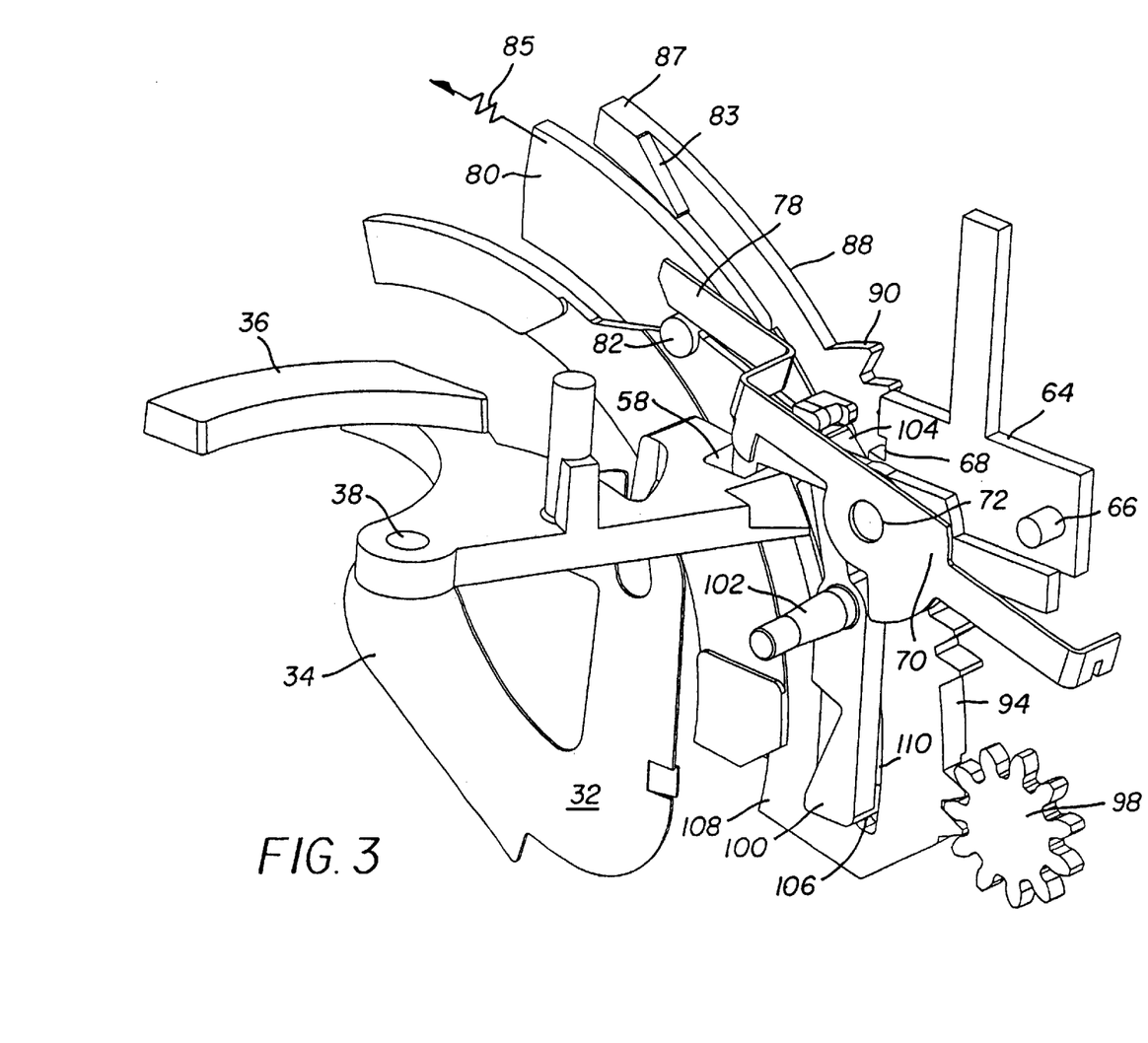
FIG. 3 illustrates a perspective view of the film exposure and self-timer systems of the camera of the present invention with the self-timer in a timer end position.
Figure 4:
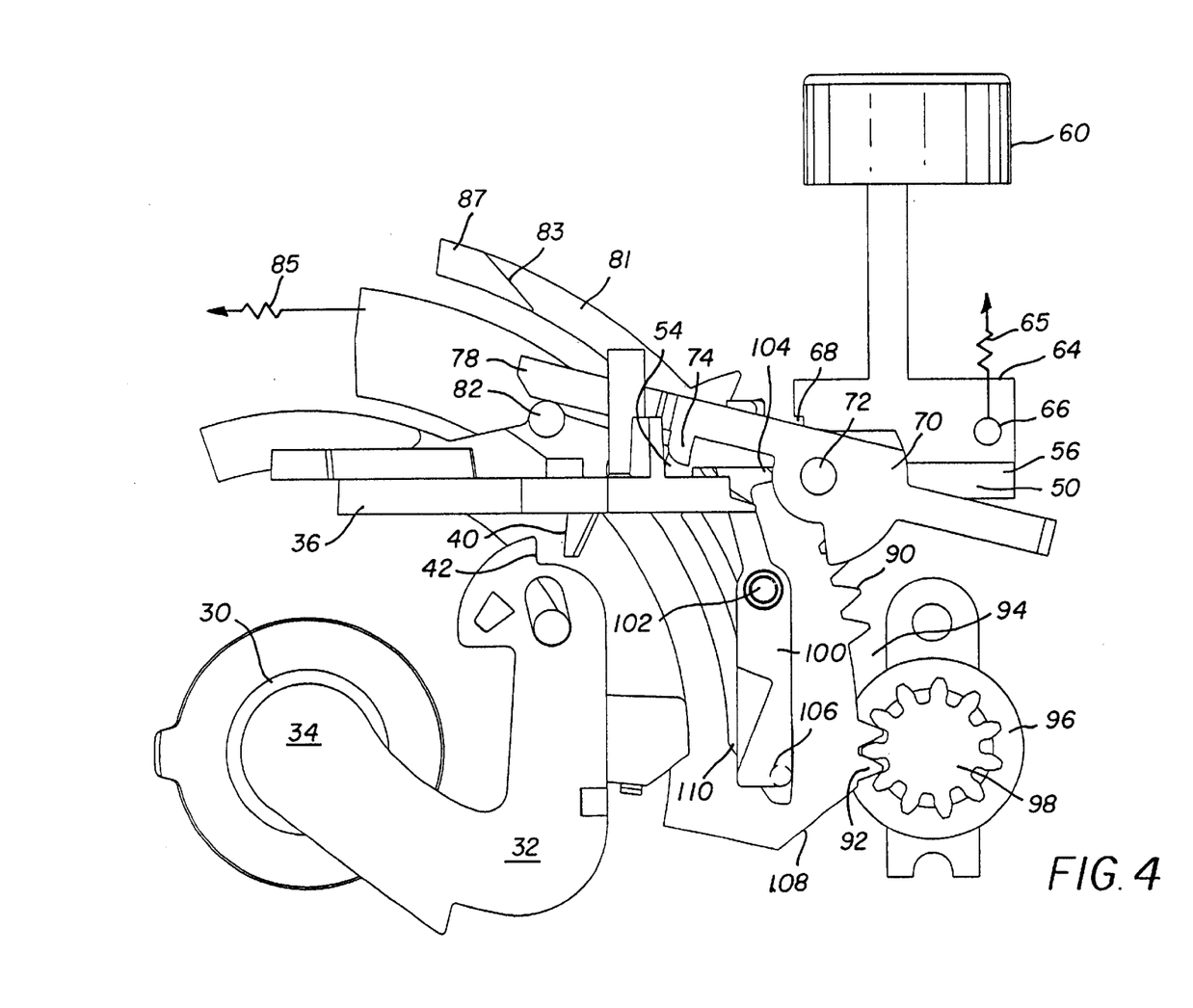
FIG. 4 illustrates a front view of the film exposure and self-timer systems of the camera of the present invention with the self-timer in a timer end position.
Figure 6:
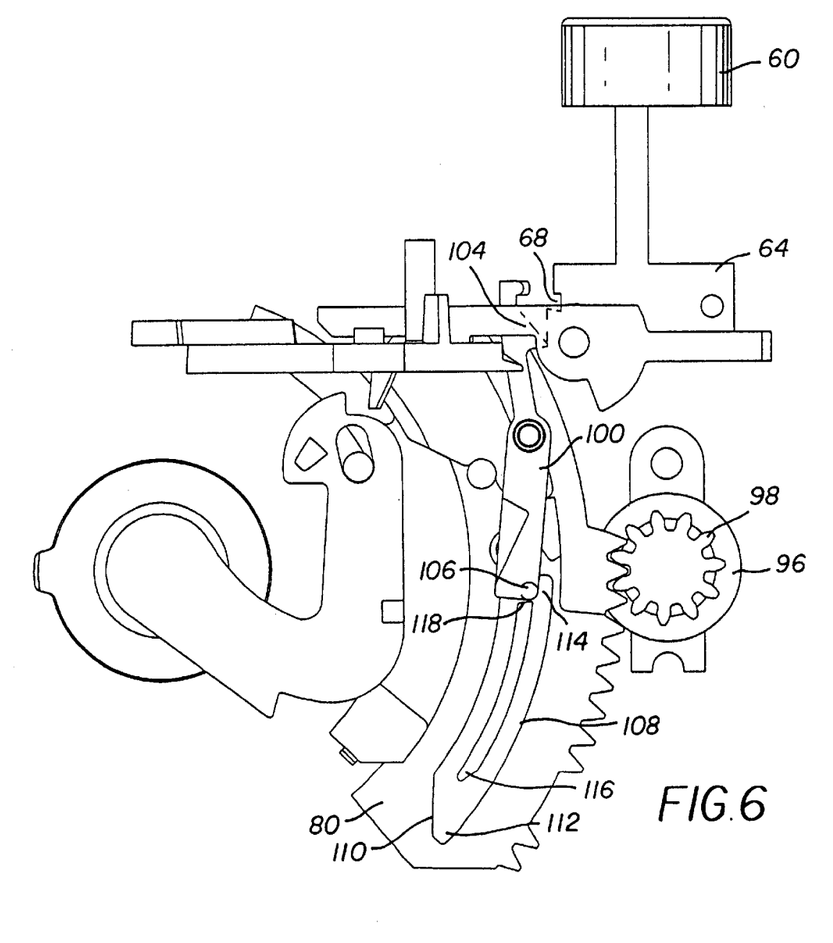
FIG. 6 illustrates a front view of the film exposure and self-timer systems of the camera of the present invention with the self-timer in a timer start position.

In this regard, actuator 80 is movable between a timer end position shown in FIGS. 1, 2, 3 and 4 and a timer start position shown in FIG. 6. As is shown in FIGS. 2 and 3, actuator 80 includes an actuator pin 82 to engage a release lever 78 on timer latch 70. When actuator 80 is in the timer end position, actuator pin 82 engages lever 78 to put timer latch 70 in the release position. Accordingly, when actuator 80 is in this position, timer latch 70 does not prohibit movement of high-energy lever 36 and, an exposure cycle can be initiated by depressing button 60 to place trigger latch 50 in the release position as is described above.

Actuator 80 is biased toward the timer end position by an actuator resilient member 85. Actuator 80 is connected to an actuator button 84 which passes through a tracked groove 86 in front cover 21 of camera 20. A camera user moves actuator 80 from the timer end position to the timer start position by advancing button 84 along tracked groove 86. As actuator 80 is moved away from the timer start position toward the timer end position, actuator pin 82 separates from lever 78. This permits timer latch 70 to be urged into the latch position by action of timer latch biasing member 75.

Timer latch 70 remains in the latch position until actuator 80 returns to the timer start position. When a camera user releases button 84, actuator biasing member 85 begins to return actuator 80 to the timer start position. However, as is shown in FIGS. 1, 2, 3 and 4, actuator 80 has an outer surface 88 that is shaped with a first set of geared teeth 90 and a second set of geared teeth 92. A separation 94 is defined between geared teeth 90 and geared teeth 92. A damper 96 is positioned proximate to actuator 80 and has a damper gear 98 to engage geared teeth 90 and 92 of actuator

80. Damper 96 resists the urging force of actuator biasing member 85 in order to slow the movement of actuator 80 from the timer start position to the timer end position. In this way, camera 20 is prevented from initiating an exposure cycle for a period of time that begins when actuator 80 is positioned in the timer start position and ends when actuator 80 is positioned in the timer end position.

It will be appreciated that frictional forces acting between engagement surface 74 of timer latch 70 and cavity 58 of high-energy lever 36 may resist separation of engagement surface 74 from cavity 58. Accordingly, it is necessary to ensure that actuator 80 contacts timer lever 78 with sufficient force to overcome this resistance. In the embodiment shown, the outer surface 88 of actuator 80 defines a separation 94. This separation permits undamped travel of actuator 80 after a desired period of delay. During this undamped travel, actuator 80 can develop sufficient momentum so that actuator pin 82 contacts lever 78 with sufficient force to overcome the frictional resistance between engagement surface 74 and cavity 58. Alternatively, the force provided by actuator pin 82 against lever 78 can also be increased by defining damper 96 and/or damper gear 98 so that they separate from contact with actuator 80 to allow undamped travel of actuator 80 after the defined period of delay. In a further alternative embodiment, the force provided by actuator pin 82 as it contact lever 78 can be increased by increasing the overall amount of potential energy stored in biasing member 85 so that the potential energy stored in the biasing member when actuator pin 82 contacts lever 78 is sufficient to overcome the frictional resistance.

It will be appreciated that damper gear 98 rotates during the period of engagement with geared teeth 90 and that this generates a certain amount of rotational momentum in damper gear 98. Although this momentum is rapidly dissipated by action of damper 96, there is a possibility that damper gear 98 can be moved by such momentum into a position of non-matching alignment with gear teeth 90. If not corrected, this condition could prevent further use of self-timer 25. Accordingly, geared teeth 92 are positioned at the end of separation 94. Geared teeth 92 engage damper gear 98 as actuator 80 enters the timer end position. Geared teeth 92 are located and calibrated so that they align gear 98 for future engagement with geared teeth 90. Geared teeth 92 also hold damper gear 98 to prevent damper gear 98 from moving into non-matching alignment with geared teeth 92 as a result of incidental movement of camera 20.

Thus, a mechanism has been shown to release timer latch 70 after a predefined period of time has elapsed from the point at which actuator 80 is moved to the timer start position. However, in the embodiment shown in FIGS. 1, 2, 3 and 4, both timer latch 70 and trigger latch 50 must be released in order to initiate an exposure cycle. Accordingly, the operation of timer latch 70 and timer latch 50 must be coordinated. Trigger lock 100 is used for this purpose. Trigger lock 100 features a center pivot 102 that is pivotally connected to body 22. On opposing sides of center pivot 102 are a button catch 104 configured to engage notch 68 and an actuator slide 106 configured to engage a circuitous path 110 that is located on surface 108 of actuator 80.

Figure 5:
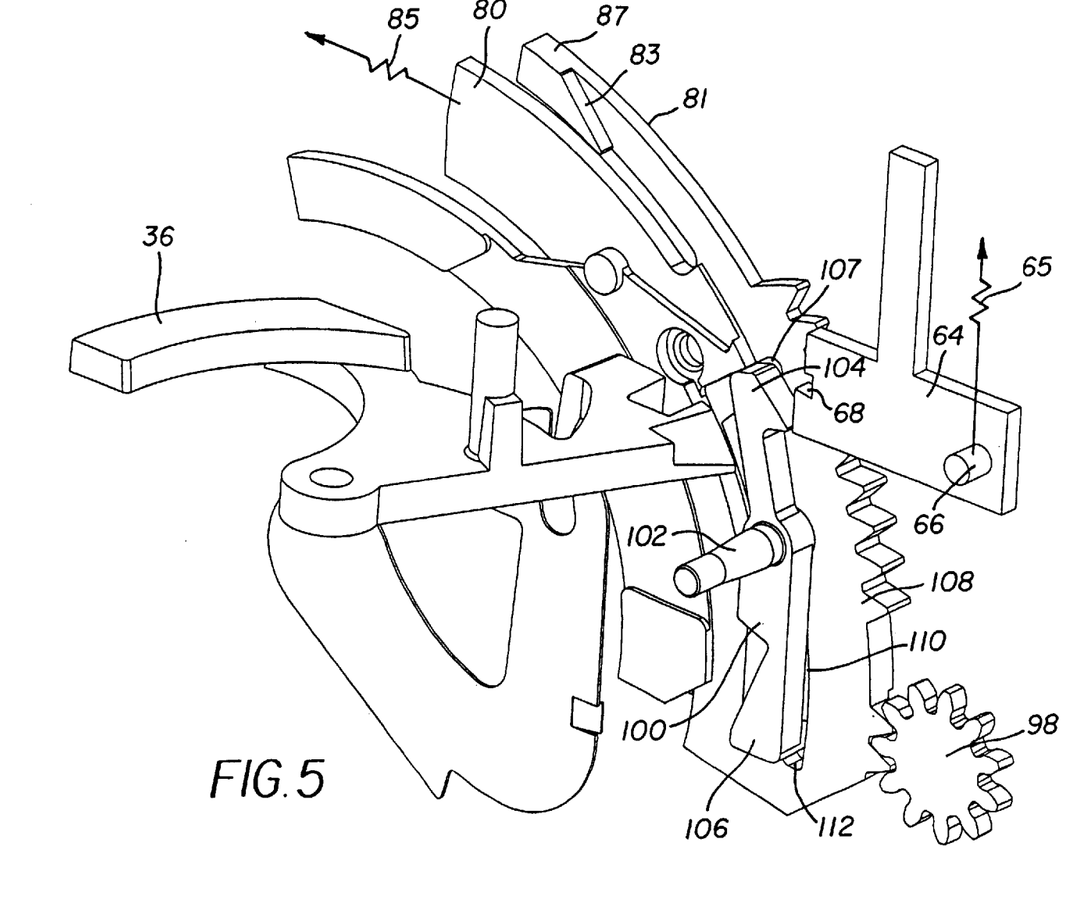
FIG. 5 illustrates a perspective view of the film exposure and self-timer systems of the camera of the present invention with the self-timer in a timer end position.

The operation of trigger lock 100 will now be explained with reference to FIGS. 5, 6, 7 and 8. FIG. 5 illustrates a perspective view of self-timer 25 with trigger latch 50 and timer latch 70 removed to show the interrelationship between button 60, actuator 80 and trigger lock 100 when actuator 80 is in the timer end position. In this position, button 60 can be moved from the outward position to the inward position without button catch 104 engaging notch 68. In this way, when actuator 80 is in the timer end position, button 60 can be used to initiate an exposure sequence without interference from trigger lock 100.

FIG. 6 illustrates the present invention with actuator 80 positioned in the timer start position. As shown, when actuator 80 is moved to the timer start position, actuator slide 106 moves from timer end position 112 along circuitous path 110 to first position 114. While in this position, slide 106 engages island 116 at an upper surface 118. This engagement prevents actuator 80 from being moved by actuator resilient member 85 from the start position to the timer end position. Actuator 90 is held in first position 114 until trigger lock 100 pivotally rotates in a clockwise direction. In this regard, trigger lock 100 is biased in the clockwise direction when it is in first position 114. This bias helps to prevent trigger lock 100 from pivoting in a counter clockwise fashion which would allow slide 106 to return to end position 112. However, as is shown in phantom in FIG. 6, trigger lock 100 cannot pivot in the clockwise direction because button catch 104 is blocked by button extension 64.

In a preferred embodiment of the present invention shown in FIGS. 5 and 6, a biasing member 81 is resiliently incorporated into actuator 80 to bias trigger lock 100 in a clockwise direction when actuator 80 is in the start position. Resilient member 81 features a ramp surface 83 and plateau 87 to engage a dowel 107 on trigger lock 100. As actuator 80 is moved from the timer end position to the timer start position, dowel 107 first engages ramp 83 and then engages plateau 87. This engagement elastically deforms resilient member 81. Resilient member 81 resists this elastic deformation by applying a bias force against dowel 107, urging trigger lock 100 in a clockwise direction. It will be appreciated that other resilient members can be used for this purpose.

Figure 7:
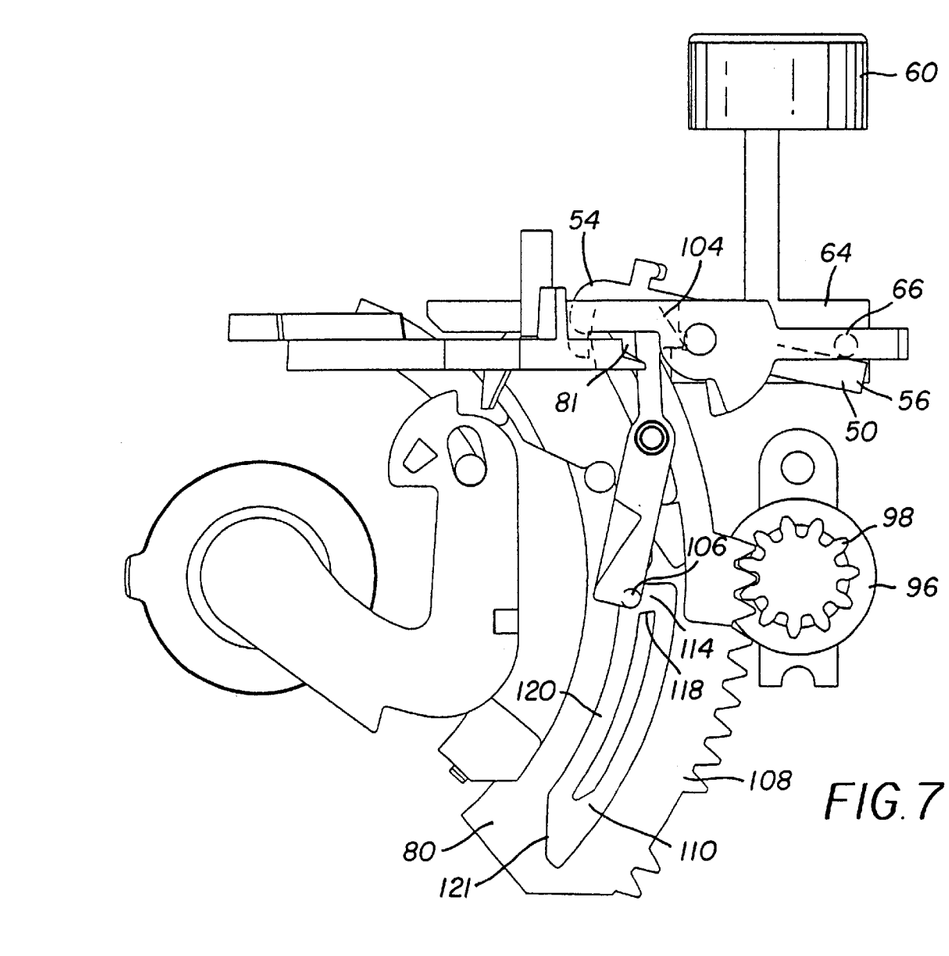
FIG. 7 illustrates a front view of the film exposure and self-timer systems of the camera of the present invention with the self-timer at the beginning of travel from the timer start position to the timer end position.

As is shown in FIG. 7, when actuator 80 is in the timer start position and button 60 is moved from the outward position to the inward position, button catch 104 is permitted to pivotally move into notch 68. This, in turn, causes slide 106 to move out of contact with upper surface 118 and into return path 120 of circuitous path 110. Once slide 106 enters circuitous path 110, actuator 80 is permitted to move from the timer start position toward the timer end position as is generally described above. As noted above, this motion is slowed by damper 96 acting through damping gear 98. By slowing this movement, a self-timing delay is created.

As is also shown in FIG. 7, while slide 106 is in return path 120, button catch 104 is held in notch 68. This prevents button 60 from returning to the outward position and, therefore, contact surface 66 holds trigger latch 50 in the release position. Accordingly, when camera 20 is in this state, all that is required to initiate an exposure cycle is to move timer latch 70 into the release position.

Figure 8:
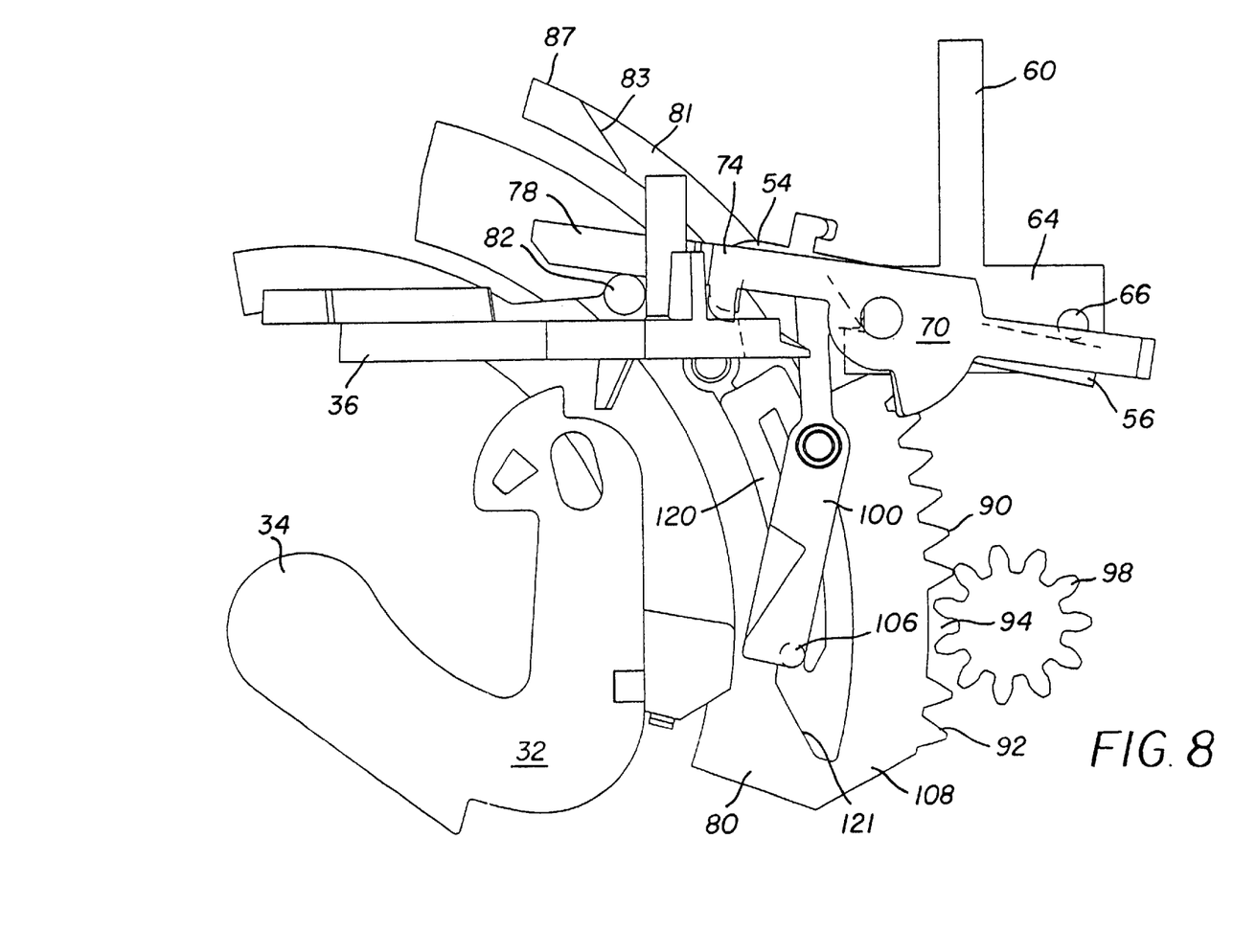
FIG. 8 illustrates a front view of the film exposure and self-timer systems of the camera of the present invention with the self-timer in the process of travelling from the timer start position to the timer end position.

As is shown in FIG. 8, when the desired delay has passed, damper gear 98 ceases to contact geared teeth 90. This permits undamped motion of actuator 80. Actuator pin 82 is then brought into contact with lever 78 to move timer latch 70 into the release position. This initiates the exposure cycle. This also brings slide 106 into contact with ramped surface 121. Once slide 106 is in contact with ramped surface 121, further motion of actuator 80 toward the timer end position causes trigger lock 100 to pivot in a direction that removes catch 106 from notch 68. Motion of actuator 80 to the timer end position also brings geared teeth 92 into contact with damper gear 98. This returns actuator 80 to the timer end position completing the duty cycle of self-timer 25.

Figure 9A:
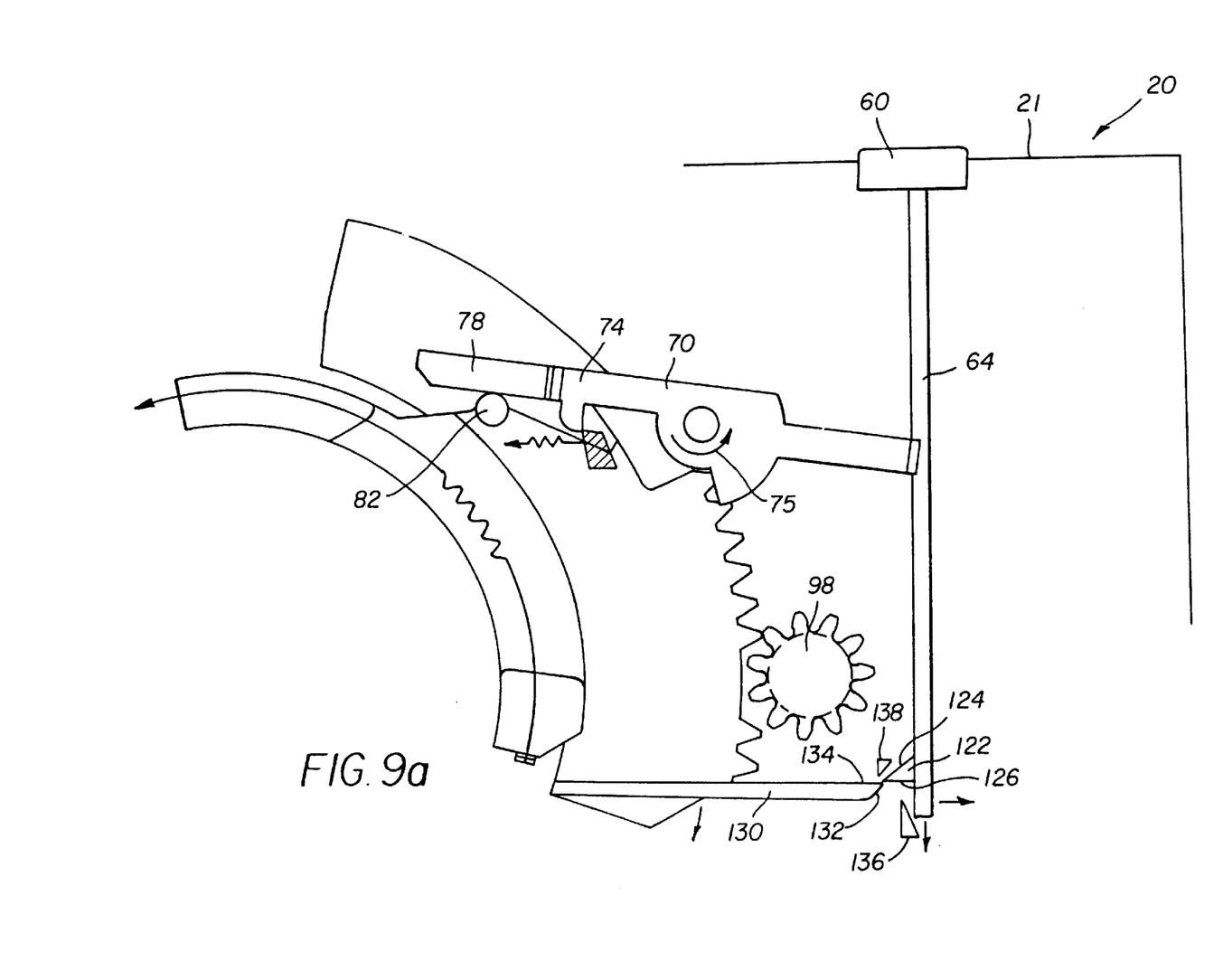
FIG. 9a illustrates an alternative embodiment of the film exposure and self-timer systems of the camera of the present invention in a normal photography mode.
Figure 9B:
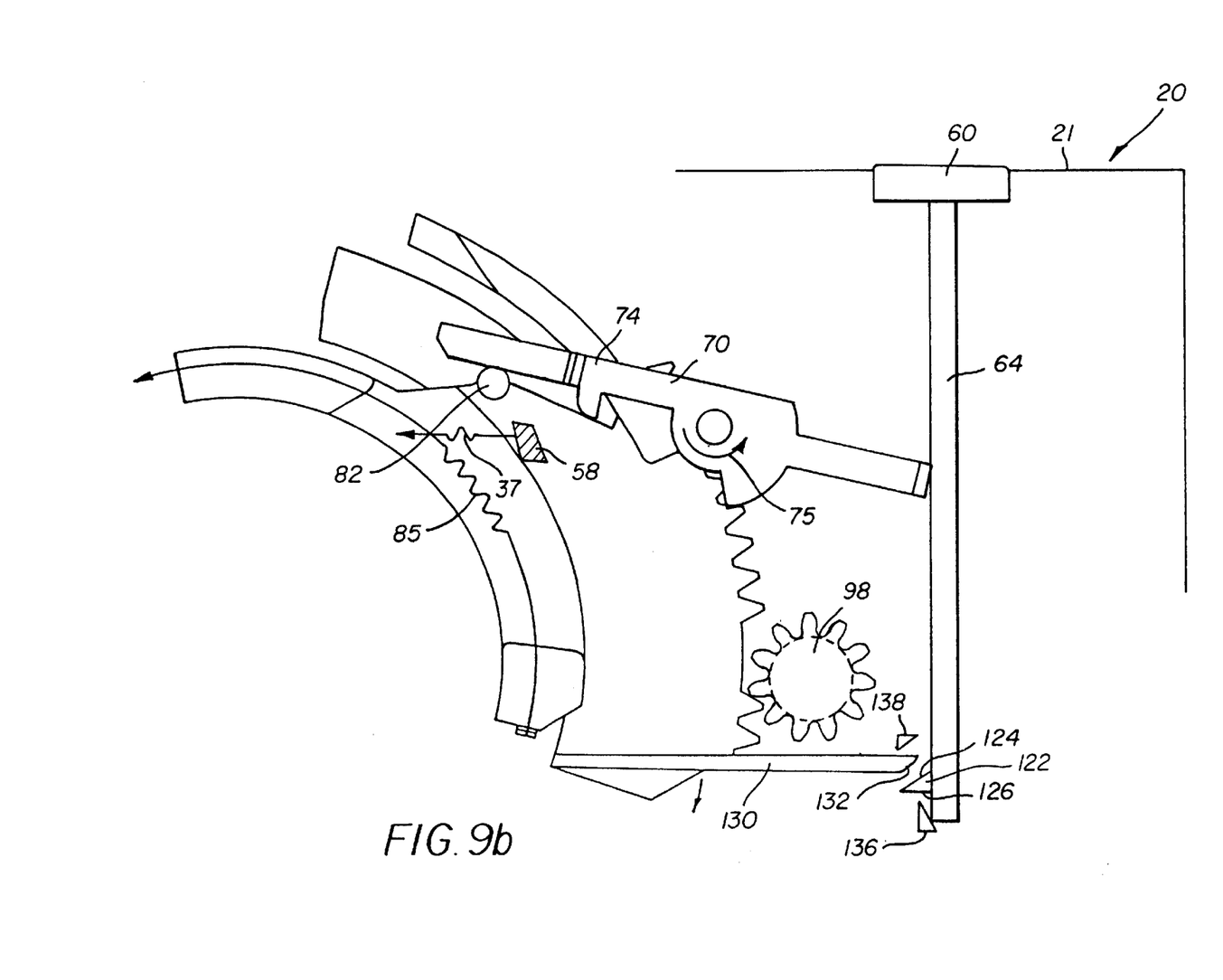
FIG. 9b illustrates an alternative embodiment of the film exposure and self-timer systems of the camera of the present invention in a normal photography mode.

FIGS. 9a and 9b show a schematic diagram of an embodiment of the present invention that permits photography in a normal mode and photography in a self-timer mode. In this embodiment, trigger lock 100 and trigger latch 50 are omitted. As is shown in FIG. 9a, button 60 has a flexible extension 64 having a button slip latch 122 with a deflection surface 124 and latch surface 126. In this embodiment, latch surface actuator 80 is also adapted with an actuator slip latch 130 having a deflection surface 132 and latch surface 134.

As is shown in FIG. 9a, during normal camera operation, button slip latch 122 engages actuator slip latch 130 at a point wherein damper gear 98 is positioned within space 94. As noted above, when actuator 80 is in this position, timer latch 70 prevents high energy lever 36 from moving. As is shown in FIG. 9b, a first deflector 136 is positioned proximate to extension 64. When button 60 is moved to an inward position, deflector 136 moves extension 68 so that contact between button slip latch 122 and actuator slip latch 130 is lost. This permits actuator 80 to move to the timer end position and release timer latch 70 to initiate an exposure cycle.

Figure 9C:
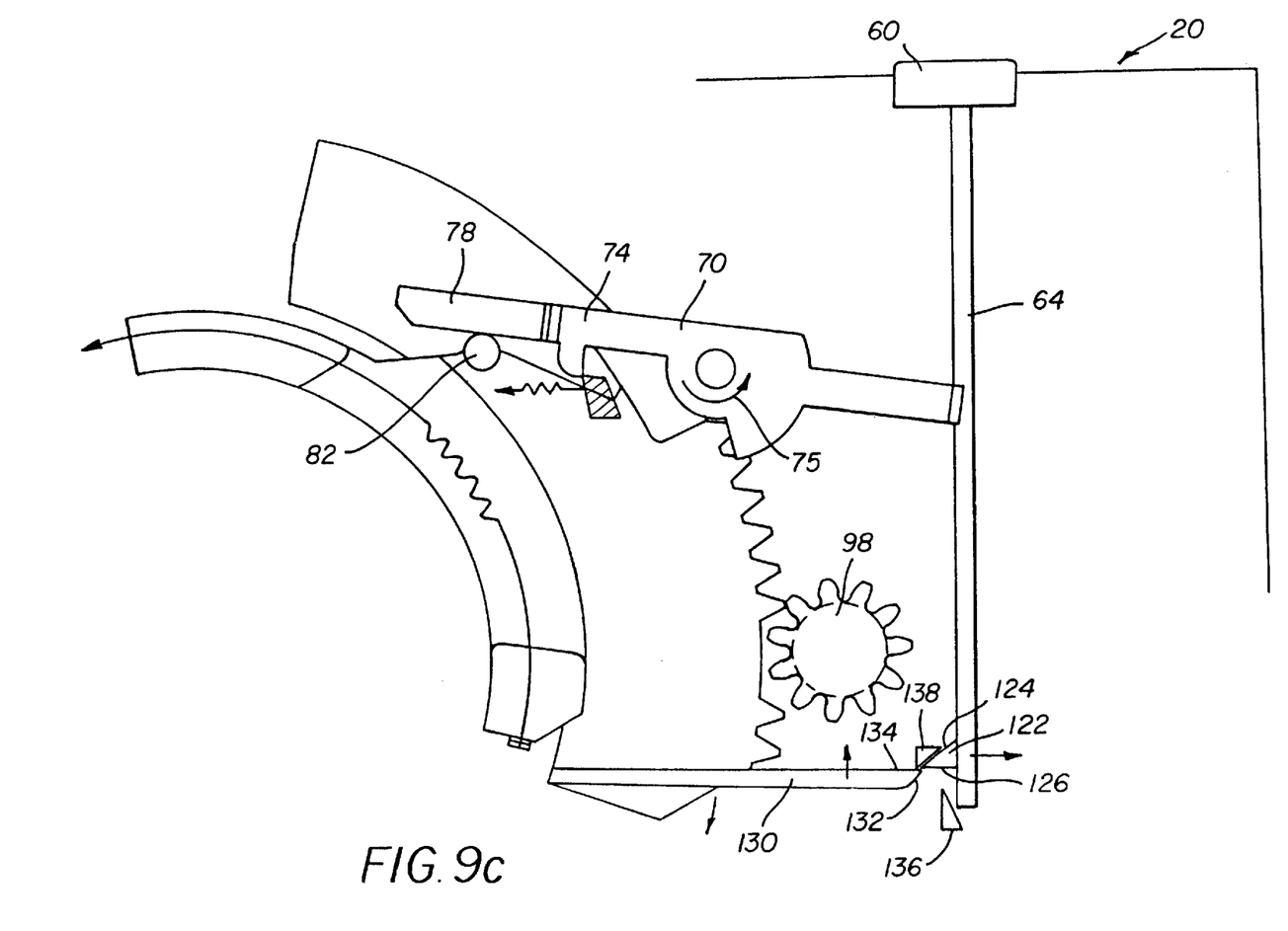
FIG. 9c illustrates an alternative embodiment of the film exposure and self-timer systems of the camera of the present invention in a self-timer mode.

To operate the camera of FIGS. 9a and 9b in the self-timer mode, the user of the camera moves actuator 80 to the timer start position using button 84 and releases button 84. This permits actuator resilient member 85 to move actuator 80 toward the timer end position. However, as is shown in FIG. 9c, as actuator 80 approaches separation 94, actuator slip latch 130 contacts button slip latch 122. This drives button deflection surface 124 into second deflector 138 which moves button latch surface 126 away from actuator latch surface 134 and permits actuator 80 to travel to the timer end position to release actuator latch surface 134. In this embodiment, separation 94 can be defined so that actuator 80 has a period of undamped travel before actuator latch surface 134 contacts button latch surface 126. This will allow actuator 80 to build sufficient momentum to cause the necessary movement of button latch surface 126.

Figure 10:
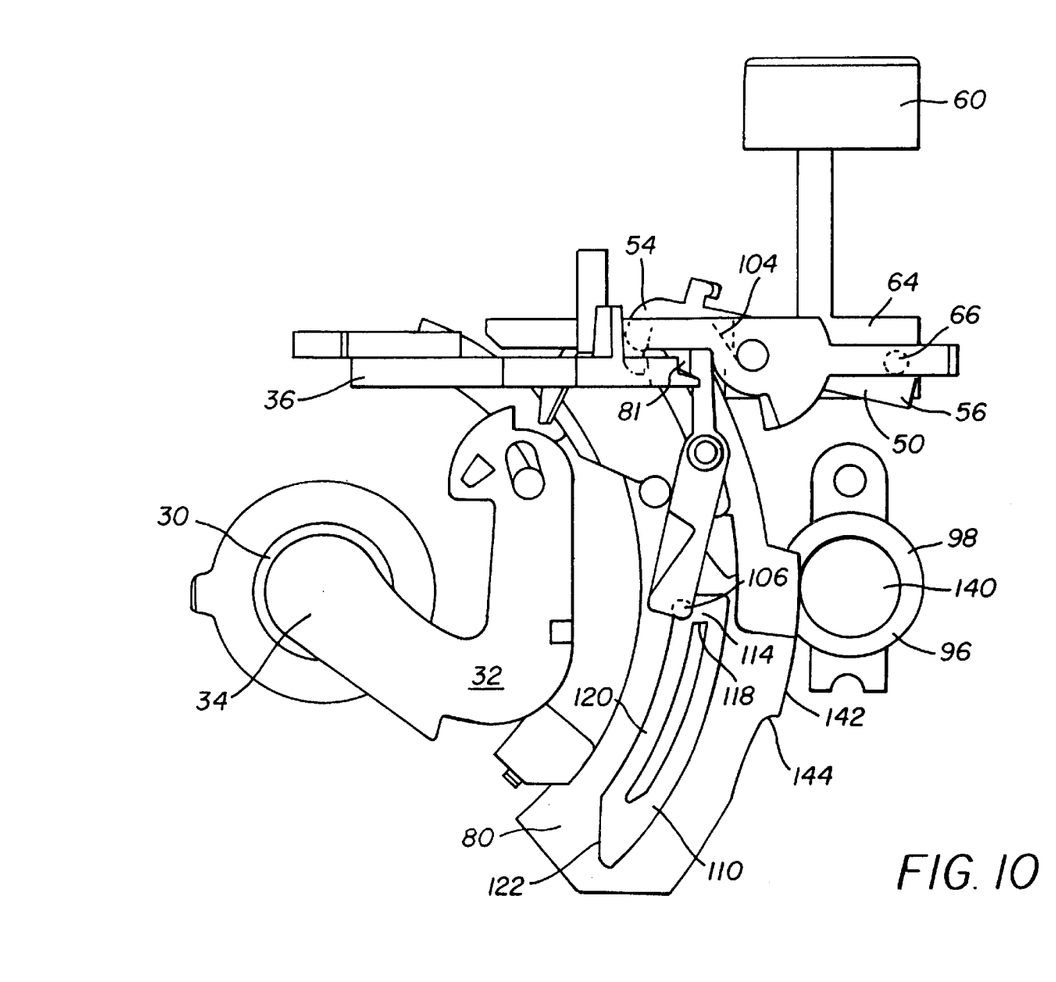
FIG. 10 illustrates an alternative embodiment of the actuator and damper of the present invention.

FIG. 10 illustrates an embodiment of the present invention that does not use geared teeth 90, 92 and 98 to engage damper 96 to outer surface 88. As is shown in FIG. 10, damper 96 can be fixed to damper friction surface 140 such as a rotatable wheel fixed to damper 96. In this embodiment, outer surface 88 is beveled to define an actuator friction surface 142 to contact the friction surface during a first range movement of actuator 80 and an actuator recess 144 to separate friction surface 140 from outer surface 88 during the second range of actuator movement. In such an embodiment, the second set of geared teeth 92 are not necessary. Further, it will be appreciated that damper 96 and damper gear 98 can be replaced by a friction surface such as a brush or slide (not shown) that create friction at a point that is separate from friction surface 130.

Self-timer 25 of the present invention can utilize other structures to lock trigger latch 50 in the release position when self-timer 25 is used. For example, actuator 80 can be adapted with a latch or other locking mechanism to hold button 60 in the inward position while actuator 80 moves from the timer start position to the timer end position. This latch can be reset after actuator 80 enters the timer end position.

Figure 11:
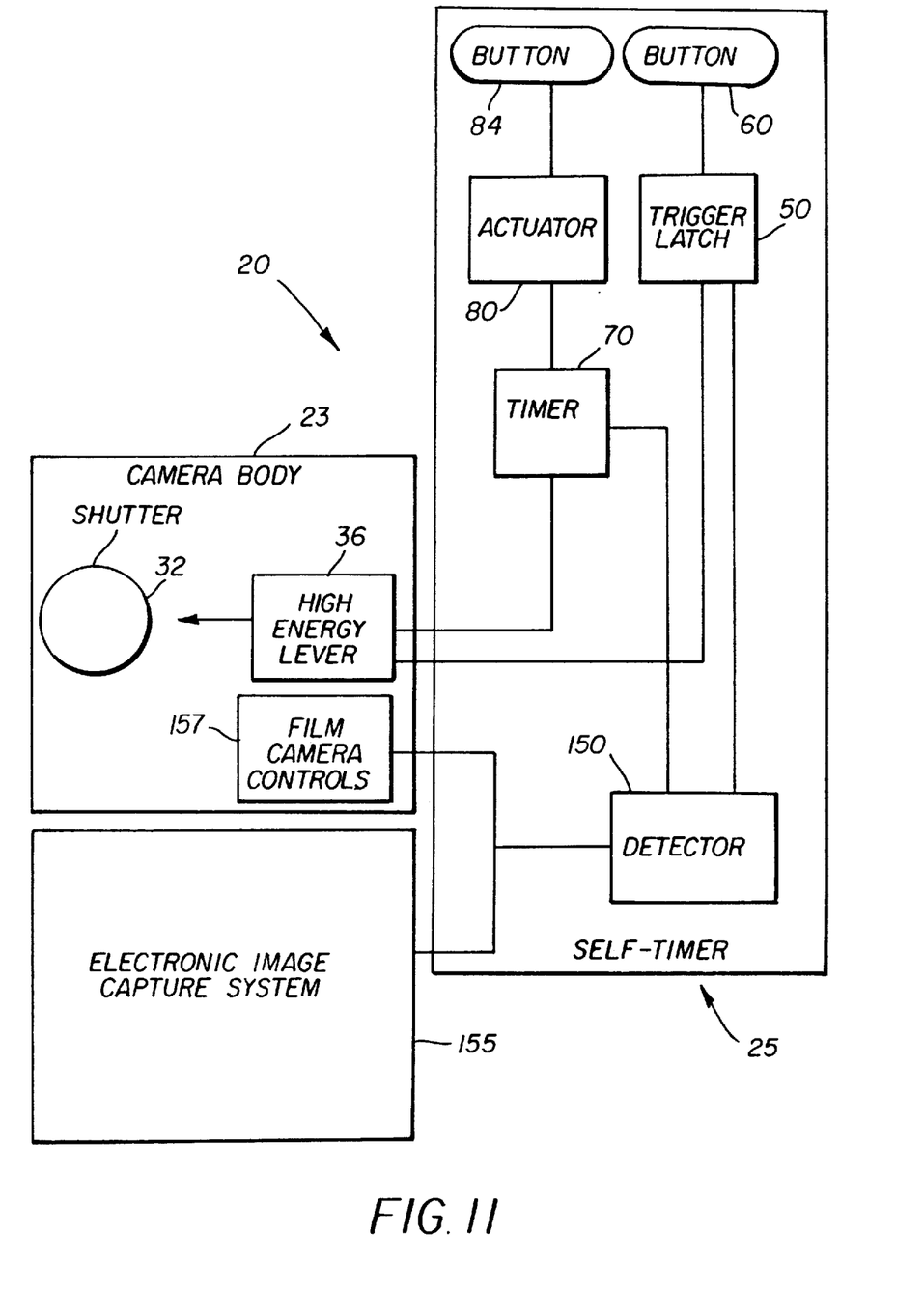
FIG. 11 illustrates a schematic diagram of an alternative embodiment of the present invention.

FIG. 11 illustrates a schematic diagram of self-timer 25 for use in self-timing camera 20 having both a film image capture system 23 and an electronic image capture system 155. In this embodiment, a user manipulates buttons 84 and/or 60 to operate camera 20 in either the normal photography mode or self-timing photography mode. As is described above, the movement of buttons 84 and/or 60 causes either one or both of timing latch 50 and timing latch 70 to move to the release position. In this embodiment, a position detector 150 such as a mechanical switch, electromechanical switch, opto-electric switch, or other sensor detects when timing latch 50 and/or timing latch 70 are in the release position. In the illustrated embodiment, detector 150 generates an electrical signal when trigger latch 50 and timing latch 70 are both in the release position. This provides a signal indicating that the film system image capture system 23 has been activated. This signal can be used to alert film camera controls 157 and the electronic image capture system 155 that a film exposure is occurring. It will also be appreciated that this embodiment is readily adaptable for use in conjunction with a camera that captures images using only an electronic image capture system.

With respect to any biasing member described herein, it will be noted that suitable biasing members include any mechanical means for storing and releasing mechanical potential energy including but not limited to springs coils, torsion bars, and elastically deformable members.

The invention has been described in detail with particular reference to certain preferred embodiments thereof, but it will be understood that variations and modifications can be effected within the spirit and scope of the invention.

PARTS LIST

| | |
|---|---|
| 20 | camera |
| 21 | front plate |
| 22 | camera body |
| 24 | film take up reel area |
| 26 | film cartridge holder |
| 27 | pivot |
| 28 | film |
| 30 | lens |
| 32 | shutter |
| 33 | shaft |
| 34 | light blocking surface |
| 36 | high-energy lever |
| 37 | second resilient member |
| 38 | shaft |
| 40 | contact surface |
| 42 | shutter contact |
| 50 | trigger latch |
| 52 | Central pivot mounting |
| 54 | capture surface |
| 55 | third resilient member |
| 56 | release surface |
| 58 | cavity |
| 60 | button |
| 62 | control surface |
| 64 | extension |
| 65 | fourth resilient member |
| 66 | contact surface |
| 70 | timer latch |
| 72 | central mounting |
| 74 | capture surface |
| 75 | timer latch biasing member |
| 76 | bias lever |
| 77 | pivot |
| 78 | lever |
| 80 | actuator |
| 82 | actuator pin |
| 84 | button |
| 85 | actuator biasing member |
| 86 | tracked groove |
| 87 | plateau |
| 88 | outer surface |
| 90 | first set of geared teeth |
| 92 | second set of geared teeth |
| 94 | separation |
| 96 | damper |
| 98 | damper gear |

-continued

PARTS LIST

| | |
|---|---|
| 100 | trigger lock |
| 102 | center pivot |
| 104 | button catch |
| 106 | actuator slide |
| 108 | surface |
| 110 | circuitous path |
| 112 | timer end position |
| 114 | first position |
| 116 | island |
| 118 | upper surface |
| 120 | return path |
| 121 | ramped surface |
| 122 | button slip latch |
| 124 | button deflection surface |
| 126 | button latch surface |
| 130 | actuator slip latch |
| 132 | actuator deflection surface |
| 134 | actuator latch surface |
| 136 | first deflection surface |
| 138 | second deflection surface |
| 140 | damper friction surface |
| 142 | actuator friction surface |
| 144 | actuator recess |
| 155 | electronic image capture system |
| 157 | film camera controls |
| L | light path |

What is claimed is:

1. A camera comprising:
at least one image capture system;
a timer latch movable between a lock position that prevents the image capture system from capturing an image and a release position that allows the image capture system to capture an image;
an actuator biased for movement between a first position separated from the timer latch and a second position moving the timer latch into the release position; and
a damper to slow the movement of the actuator; and
a trigger latch moveable between a shutter latch position preventing movement of the timer latch and a shutter release position permitting movement of the timer latch and further comprising a moveable button that advances the trigger latch from the shutter latch position to the shutter release position.

2. The camera of claim 1, wherein the button is adapted with a button lock notch and further comprising a biasing member to bias the button away from the shutter release position.

3. The camera of claim 2, further comprising a linkage having a capture surface to engage the button lock notch and is moveable by the actuator between a trigger lock position holding the capture surface in the notch and a trigger release position separating the capture surface from the notch.

4. The camera of claim 3, wherein the linkage defines a slide for engaging the actuator and the actuator defines a slide circuit to guide the slide during actuator movement to move the capture surface into and out of engagement with the button lock notch.

5. The camera of claim 1 further comprising a position detector generating a signal when the trigger latch and timer latch are in the release position.

6. A camera comprising:
at least one image capture system having a movement actuated shutter;
a biased lever to move the shutter;
a timer latch movable between a lock position preventing the lever from moving the shutter and a release position permitting the lever to move the shutter;
an actuator biased for movement between a first position separated from the timer latch and a second position driving the timer latch into the release position; and
a damper to slow the movement of the actuator;
wherein movement of the actuator is damped during a first range of movement and is undamped during a second range of movement proximate to the second position.

7. The camera of claim 6 wherein said damper further comprises a damper gear and wherein the actuator comprises a geared surface to engage the damper gear during the first range of actuator movement and a non-geared surface during the second range of actuator movement.

8. The camera of claim 7 wherein the actuator further comprises a second geared surface to position the damper gear in matching alignment with the geared surface when the actuator is in the second position.

9. The camera of claim 6 wherein the damper further comprises a friction surface and wherein the actuator is beveled to contact the friction surface during the first range of actuator movement and to define a gap between the friction surface and the outer surface during the second range of actuator movement.

10. The camera of claim 6, wherein the actuator is adapted for contact with the damper during the first range of motion and further adapted to separate from contact with the damper during a second range of motion.

11. The camera of claim 6, wherein the damper is adapted for contact with the actuator during the first range of actuator motion and further adapted to separate from contact with the actuator during a second range of actuator motion.

12. The camera of claim 6 further comprising a trigger latch moveable between a shutter latch position preventing movement of the lever and a shutter release position permitting movement of the lever and further comprising a moveable button that advances the trigger latch from the shutter latch position to the shutter release position.

13. The camera of claim 12, wherein the button is adapted with a button lock notch and further comprising a biasing member to bias the button away from the shutter release position.

14. The camera of claim 13, further comprising a linkage having a capture surface to engage the button lock notch and is moveable by the actuator between a trigger lock position holding the capture surface in the notch and a trigger release position separating the capture surface from the notch.

15. The camera of claim 14, wherein the linkage defines a slide for engaging the actuator and the actuator defines a slide circuit to guide the slide during actuator movement to move the capture surface into and out of engagement with the button lock notch.

16. The camera of claim 6, wherein the image capture system comprises a film capture system having a moveable shutter 17. The camera of claim 6 further comprising a position detector to generate a signal when the timer latch is in the release position.

18. The camera of claim 12 further comprising a position detector to generate a signal when the timer latch and the trigger latch are in the release position.

19. A timer for use in a camera having at least one image capture system, the timer comprising:
a timer latch biased for movement between a lock position that prevents the at least one image capture system from capturing an image and a release position that allows the image capture system to capture an image;
an actuator biased for movement between a first position separated from the timer latch and a second position moving the timer latch into the second position;

a damper to slow the movement of the actuator; and a trigger latch moveable between a latch position preventing image capture and a release position permitting image capture and further comprising a moveable button that advances the trigger latch from the shutter latch position to the shutter release position.

20. The timer of claim 19, wherein the button is adapted with a button lock notch and further comprising a biasing member to bias the button away from moving the shutter latch position to the shutter release position.

21. The timer of claim 20, further comprising a linkage having a capture surface to engage the button lock notch and is moveable by the actuator between a trigger lock position holding the capture surface in the notch and a trigger release position separating the capture surface from the button lock notch.

22. The timer of claim 21, wherein the linkage defines a slide for engaging the actuator and the actuator defines a slide circuit to guide the slide during actuator movement to move the capture surface into and out of engagement with the button lock notch.

23. The timer of claim 21 further comprising a position detector generating a signal when the timing latch and the trigger latch are in the release position.

24. A timer for use in a camera having at least one image capture system with a movement actuated shutter, the timer comprising:

a lever biased to move the shutter a timer latch biased for movement between a lock position preventing the lever from moving the shutter and a release position permitting the lever to move the shutter;

an actuator biased for movement between a first position separated from the timer latch and a second position driving the timer latch into the release position; and a damper positioned to engage the outer surface to slow the movement of the actuator;

wherein movement of the actuator is damped during a first range of actuator movement and is undamped during a second range of actuator movement proximate to the second position.

25. The timer of claim 24 wherein said damper further comprises a damper gear and wherein the actuator comprises a geared surface to engage the damper gear during the first range of actuator movement and a non-geared surface during the second range of actuator movement.

26. The timer of claim 25 wherein the actuator further comprises a second geared surface to position the damper gear in matching alignment with the geared surface when the actuator is in the second position.

27. The timer of claim 24 wherein the damper further comprises a friction surface and wherein the outer surface is beveled to contact the friction surface during the first range of actuator movement and to define a gap between the friction surface and the actuator during the second range of actuator movement.

28. The timer of claim 24, wherein the actuator is adapted for contact with the damper during the first range of motion and further adapted to separate from contact with the damper during the second range of motion.

29. The timer of claim 24, wherein the damper is adapted for contact with the actuator during the first range of actuator motion and further adapted to separate from contact with the actuator during the second range of actuator motion.

30. The timer of claim 24 further comprising a trigger latch moveable between a shutter latch position preventing movement of the lever and a shutter release position permitting movement of the lever and further comprising a moveable button that advances the trigger latch from the shutter latch position to the shutter release position.

31. The timer of claim 30, wherein the button is adapted with a button lock notch and further comprising a biasing member to bias the button away from the shutter release position.

32. The timer of claim 31, further comprising a linkage having a capture surface to engage the button lock notch and is moveable by the actuator between a trigger lock position holding the capture surface in the notch and a trigger release position separating the capture surface from the notch.

33. The timer of claim 32, wherein the linkage defines a slide for engaging the actuator and the actuator defines a slide circuit to guide the slide during actuator movement to move the capture surface into and out of engagement with the button lock notch.

34. The timer of claim 24 further comprising a position detector to generate a signal when the timer latch is in the release position.

35. The timer of claim 24 wherein the position detector generates a signal when the trigger latch and timer latch are in the release position.

* * * * *